No. 748,554. PATENTED DEC. 29, 1903.
J. W. CORLEY.
EYEGLASSES.
APPLICATION FILED MAY 16, 1903.
NO MODEL.

Witnesses:—

Inventor:—
John Wesley Corley,
by Horace G. Seitz
his Attorney.

No. 748,554. Patented December 29, 1903.

UNITED STATES PATENT OFFICE.

JOHN WESLEY CORLEY, OF NEW YORK, N. Y., ASSIGNOR OF ONE-HALF TO HUGH CONNOLLY, OF DETROIT, MICHIGAN.

EYEGLASSES.

SPECIFICATION forming part of Letters Patent No. 748,554, dated December 29, 1903.

Application filed May 16, 1903. Serial No. 157,346. (No model.)

*To all whom it may concern:*

Be it known that I, JOHN WESLEY CORLEY, a citizen of the United States, residing at New York, in the county of New York and State of New York, have invented certain new and useful Improvements in Eyeglasses; and I do hereby declare the following to be a full, clear, and exact description of the invention, such as will enable others skilled in the art to which it appertains to make and use the same.

My invention relates to improvements in eyeglasses, and has particular relation to means for locking the spring and guard to the stud.

In securing the spring to the stud in forming eyeglasses the connection is generally made by means of a screw of usual form passing through the spring and guard (if such be used) into the stud. Such construction, however, possesses several disadvantages—as, for instance, the fact that the screw gradually works loose, a result invariably obtained unless the spring and guard closely and accurately fit the recess or notch in the stud, owing to the rocking of the parts affecting the position of the screw. If the screw be loosened, the parts are permitted to "wabble," the friction between the head of the screw and the guard with which it contacts being insufficient to retain the screw against a turning movement unless the screw be jammed down upon the guard, in which case, owing to the relatively small size of the screw, there is a tendency to break the head of the screw either on its face or at the point of connection with the screw-stem, due to the fact that the pressure is exerted solely against the head in a direction axially of the screw.

In the present invention the object is to provide a construction in which the disadvantages above presented are eliminated and which will provide a simple and efficient fastening for the several parts of eyeglasses.

To these and other ends, the nature of which will be readily perceived as the invention is hereinafter fully described, said invention consists in the improved construction and combination of parts hereinafter fully described, illustrated in the accompanying drawings, in which similar reference characters indicate similar parts, and particularly pointed out in the appended claims.

Figure 1:
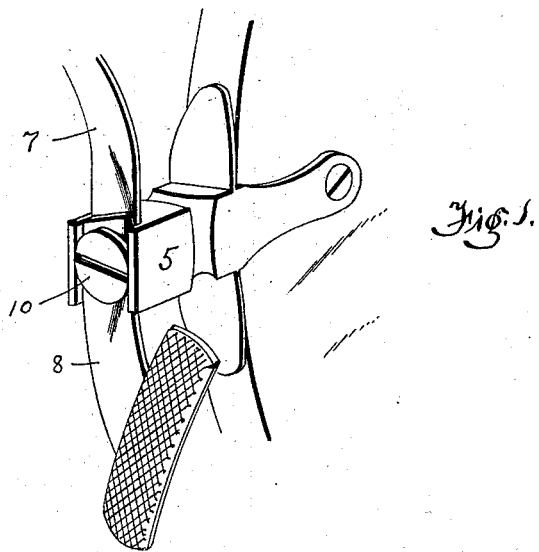
Figure 2:
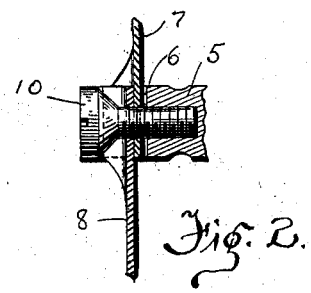
Figure 3:
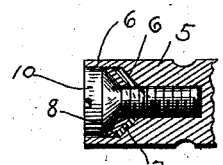

In the drawings, Figure 1 is a perspective view of a portion of a pair of eyeglasses, showing my invention in position thereon. Fig. 2 is a central vertical sectional view of the stud, the spring and guard being secured in position in accordance with my invention. Fig. 3 is a similar view taken at right angles to Fig. 2.

To prevent the loosening of the securing-screws in eyeglasses, attempts have been made to provide a device coacting with the screw-head—such, for instance, as a nut-lock of suitable form—which will hold the head against rotation. Owing, however, to the small size of the screw and its head and the requirement that the eyeglasses must be of a minimum weight, such locking device must be small in size and delicate in manufacture, making the structure of considerable expense, and while such structure would possibly prevent the breaking of the screw, which would result under the necessary exertion of pressure in tightening the screw under ordinary circumstances, the necessity of releasing this fragile lock at times when repairs are to be made to the lenses, &c., generally destroys the purpose of the improvement.

I have found in practice that the use of an extra lock, such as noted, is not necessary to obtain the best results, but that by forming the stud, guard, spring, and screw in such manner that the forcing of the screw into its opening in the stud will tend to spread the guard and spring laterally at an angle toward the wall of the stud the guard and spring will not only be held in position, but that the friction resulting from the opposing surfaces of the screw and spring or guard will retain the screw against a movement to loosen the parts. To obtain this result, I form the portion of the several parts which oppose each other angular with relation to the longitudinal axis of the screw, and hence as the latter is driven "home" there will be formed a frictional engagement, which is located on opposite sides of the screw and which extends in a sense longitudinally of the screw. Furthermore, the edges of the spring and guard during the driving of the screw will be forced toward the walls of the stud, thereby retaining the parts against any rocking movement and thereby preventing the tendency to loosen the screw in the use of the glasses.

In the drawings, 5 designates the stud having the vertically-extending recess 6, the bottom of the recess being V-shaped, as shown in Fig. 3. In other respects the stud may be of any preferred form and construction, the connection between the lens and stud forming no part of the present invention.

7 designates the spring, and 8 the guard. Each of these parts at their free ends are formed substantially V-shaped in cross-section, these ends being adapted to pass into the recess 6 one above the other, as shown in the drawings.

9 designates a screw having a head and stem portion of usual form, these parts, however, being connected by a beveled or tapered portion 10, leading from the periphery of the head to the periphery of the screw-stem. In other words, the head of the screw instead of having a flat inner or rear face is beveled or tapered rearwardly, thereby providing a reinforced portion where contact is made with the guard in forcing the screw home, while the contact of the opposing faces of the portion 10 and guard extends in a direction at an angle of approximately forty-five degrees to the longitudinal axis of the screw instead of at right angles thereto, thereby eliminating all liability of forcing the head from the stem portion of the screw. From this it will be seen that instead of providing a flat surface against which the spring contacts, such as is now in general use, I form the stud with a recess the bottom of which is V-shaped in cross-section, with the result that the opposing faces of the stud and spring are not flat, and therefore capable of a lateral or pivotal movement relatively to each other, especially when the walls of the recess do not closely fit the edges of the spring and guard, such as may result where the surfaces are flat, but are held fixedly against such relative movement, due to the shape of the parts.

While I have shown the openings in the guard and spring as of a size to permit of the passage of the screw-stem, it will be readily understood that said openings may be elongated to permit of an adjustment of the parts, the shape of the screw-head, guard, spring, and the stud-recess aiding in locking the several parts together to prevent a disarrangement of the adjusted parts, the locking, however, being such that the parts can be disengaged without changing or distorting the form of or destroying any of the parts forming the connection.

Having thus described the invention and pointed out one way of carrying the same into effect, without, however, specifying the several modifications which might be made without departing from the spirit and scope thereof, what I claim as new is—

1. In eyeglasses, the combination with the stud having a recessed end, and the spring, of means for retaining one end of the spring within said recessed end, said end, spring, and retaining means having faces in parallelism, said means exerting pressure in a direction angularly to the longitudinal axis of the stud.

2. In eyeglasses, the combination with the stud having a recessed end, and the spring and guard, of means for retaining the spring and guard within said recessed end, the guard and spring being in contact, the faces thereof being in parallelism, said means exerting pressure in a direction angularly to the longitudinal axis of the stud.

3. In eyeglasses, the combination with the stud having a recessed end, and the spring and guard seated within said end, said spring and guard being in contact, the faces thereof being in parallelism, of a screw for retaining said spring and guard in position within said recessed end, said screw exerting pressure in a direction angular to the longitudinal axis of the stud.

4. In eyeglasses, the combination with the stud having a recessed end, the spring and guard seated within said end, said spring and guard being in contact, the faces thereof being in parallelism, of a screw for retaining said spring and guard in position within said end, said screw exerting pressure, on opposite sides, in a direction angular to the longitudinal axis of the stud.

5. In eyeglasses, a stud having a recessed end, the bottom of the recess being substantially V-shaped in cross-section, the spring and guard seated within said recess, the inserted ends of the spring and guard having a shape conforming substantially to the shape of the bottom of the recess, and a screw adapted to retain said bow and guard in position, said screw having a tapered portion adapted to exert pressure on said spring and guard in a direction angular to the longitudinal axis of the post.

In testimony whereof I have affixed my signature in presence of two witnesses.

JOHN WESLEY CORLEY.

Witnesses:
OSCAR T. BROWN,
JOSEPH H. PRISK.